United States Patent [19]

Malinoski et al.

[11] Patent Number: 4,960,451
[45] Date of Patent: Oct. 2, 1990

[54] METHOD OF MAKING FUSED HOLLOW COMPOSITE ARTICLES

[75] Inventors: David A. Malinoski, Manchester; Robert V. Conde, South Windsor, both of Conn.

[73] Assignee: United Technologies Corporation, Hartford, Conn.

[21] Appl. No.: 396,266

[22] Filed: Aug. 21, 1989

[51] Int. Cl.$^5$ .............................................. C03C 25/02
[52] U.S. Cl. .......................................... 65/3.2; 65/4.3; 427/35; 427/53.1
[58] Field of Search .................... 65/3.1, 3.2, 4.3, 18.2, 65/146, 32.2, 36, 43, 60.53, 60.8; 264/134, 173, 174, 103, 209.2, 280, 310, 312, 81; 427/35, 53.1, 379

[56] References Cited

U.S. PATENT DOCUMENTS

| | | | |
|---|---|---|---|
| 2,574,221 | 11/1951 | Modigliani | 65/3.1 |
| 3,629,049 | 12/1971 | Olcott | 264/81 |
| 3,676,096 | 7/1972 | Schuller et al. | 65/3.1 |
| 3,715,253 | 2/1973 | Olcott | 264/81 |
| 3,895,084 | 7/1975 | Baver | 264/81 |
| 3,933,453 | 1/1976 | Burke et al. | 249/183 |
| 4,189,618 | 2/1980 | Bretts et al. | 156/175 |
| 4,547,210 | 10/1985 | Schneider | 65/3.1 |
| 4,660,928 | 4/1987 | Jaeger et al. | 350/96.33 |

FOREIGN PATENT DOCUMENTS

| | | | |
|---|---|---|---|
| 53-67447 | 6/1978 | Japan | 65/18.2 |
| 532456 | 7/1939 | United Kingdom | 65/3.1 |
| 1163979 | 9/1969 | United Kingdom | |

Primary Examiner—David L. Lacey
Assistant Examiner—John J. Bruckner
Attorney, Agent, or Firm—Charles E. Sohl

[57] ABSTRACT

Technique for producing hollow composite articles utilizing vapor deposition. Fibers, wound around a supply reel, are fed to a take-up reel, while glass matrix is deposited on the fiber substrate via a vapor deposition process. The layers of fiber/matrix on the take-up reel are heated to fuse the composite, producing a glass matrix composite.

3 Claims, 1 Drawing Sheet

METHOD OF MAKING FUSED HOLLOW COMPOSITE ARTICLES

TECHNICAL FIELD

This invention relates to a method for producing composite articles, and especially to the production of hollow composite articles, such as rings.

BACKGROUND ART

High strength, heat-resisting structural materials are being intensively developed for commercial and other uses. Fiber reinforcement of glass, glass-ceramic, ceramic, and thermoplastic materials is a commonly practiced technique for adding strength and toughness t these materials; broadening their applications. Yet, improved production techniques are fervently sought. Present techniques include press molding, injection molding, and plasma spraying; U.S. Pat. Nos. 4,412,854, 4,786,304, and 4,769,195, respectively (incorporated herein by reference).

Press molding which uses a hot press to infiltrate woven and/or non-woven fiber preforms with a slurry, is impractical for complex or hollow articles. Injection molding, as described in U.S. Pat. No. 4,786,304, capable of producing hollow and complex articles by transferring a heated matrix material to a cavity holding a fiber preform, is costly due to the pre-alignment of fibers. Plasma spraying can be used to produce hollow articles, as described in U.S. Pat. No. 4,769,195, by jetting glass powder onto fibers, creating a preform. The preform is then molded to the desired form, and subjected to thermal molding. Another method of producing hollow composite articles involves winding a metallic glass filament around a mandrel, applying a liquid resin to embed the filament therein, and removing the mandrel (U.S. Pat. No. 4,189,618 incorporated herein by reference).

Although techniques for producing hollow composite articles exist, improved techniques are sought. The objective of the present invention is to introduce a new technique for the production of hollow composite articles which comprises the utilization of a vapor deposition process.

DISCLOSURE OF INVENTION

According to this invention, a technique for fabricating a hollow glass matrix composite involves vapor deposition. Since the fabrication takes place within a vacuum, high strength fibers which normally oxidize in atmosphere can be used. The process consists of feeding the fiber substrate from a supply reel to a take-up reel, within a vacuum chamber. As the substrate passes between the reels, the glass matrix material is deposited on the substrate by a vapor deposition process. As the coated fibers are wound around the take-up reel layers are formed which are then heated in order to consolidate the composite.

The foregoing and other features and advantages of the present invention will become more apparent from the following description and accompanying drawings.

BEST MODE FOR CARRYING OUT THE INVENTION

This invention describes using vapor deposition within a vacuum to form a hollow glass matrix composite. Various fibers, such as boron, metal, or even graphite, can be used with this technique. Since the system is run in a vacuum, fibers which oxidize in air may be used. The only requirements are chemical compatibility between the fibers and matrix, and that the fibers soften at a much greater temperature than the matrix.

Although various glass matrix material may be employed, the glass matrix which is particularly suitable for this process is $SiO_2$ base glass.

Figure 1:
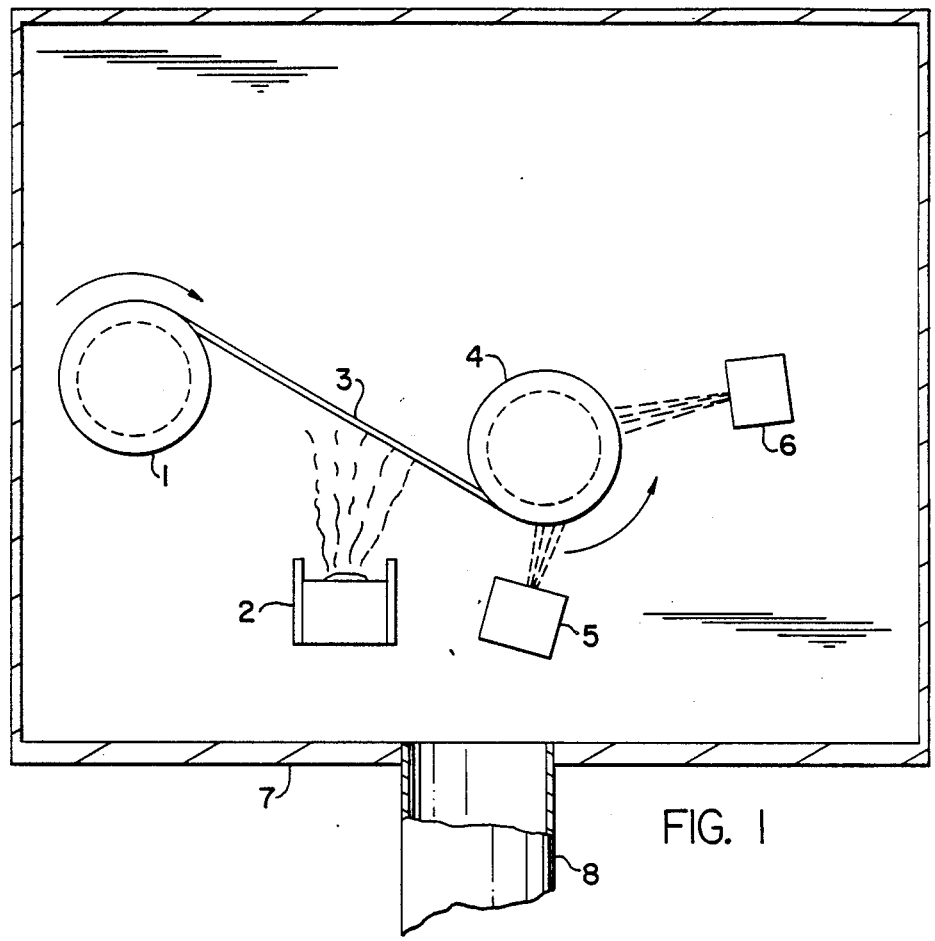
FIG. 1 shows the apparatus used to produce the hollow glass matrix composite article.
Figure 2:
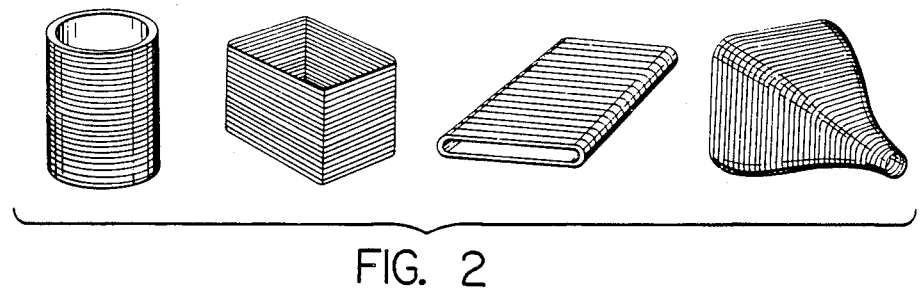
FIG. 2 represents possible article shapes which may be produced using this invention.

As shown in FIG. 1, fibers are sent from a supply reel (1) to a take-up reel (4), while $SiO_2$ (2) deposits on the fiber surface between the reels (3). The layers of fibers which form on the take-up reel (4) are preheated (5), and then heated (6), to fuse the composite. The preferred time and temperatures is determined for each glass matrix utilized as the condition which the glass matrix vaporizes (2) and the layers fuse together (5 & 6); this may be readily determined by experiment. The heating mechanisms used were electron beam guns, but lasers can just as readily be employed. FIG. 2 represents possible article shapes which can be produced using this invention.

The inner diameter of the hollow composite is determined by the outer diameter of the take-up reel. The service temperature of this material is in excess of 1000° F.

Although this invention has been shown and described with respect to detailed embodiments thereof, it will be understood by those skilled in the art that various changes in form and detail thereof may be made without departing from the spirit and scope of the claimed invention.

We claim:

1. A method for producing hollow composite articles from fibers and a glass matrix precursor, wherein said fibers are chemically compatible with said fibers, comprising providing at least one fiber supply reel and at least one fiber take-up reel within a low pressure chamber, said fibers connected to both reels and said glass matrix precursor a. creating a vacuum within said chamber;
   b. moving the fibers from said supply reel to said take-up reel;
   c. vaporizing the glass matrix precursor inside the chamber in the proximity of the moving fibers, whereby the vaporized glass matrix precursor is deposited on the moving fibers before the fibers reach the take-up reel;
   d. heating the fibers that are on the take-up reel by heating means, wherein the means for heating is selected from the group consisting of electron beam guns and lasers;

whereby the outer diameter of the take-up reel is the desired inner diameter of the article, and wherein the vaporized glass matrix precursor deposits on and thereby coats the fibers with matrix material and the heating of the coated fibers on the take-up reel causes the matrix coating on said fibers to fuse together creating a hollow composite article.

2. A method as in claim 1 wherein an $SiO_2$ base glass is the matrix material.

3. A method as in claim 1 wherein the fibers are chosen from the group consisting of boron, metal, and grahite.

* * * * *